W. B. PEDELTY.
DRIVING MECHANISM.
APPLICATION FILED JULY 11, 1917.
1,258,446. Patented Mar. 5, 1918.
FIG_1_
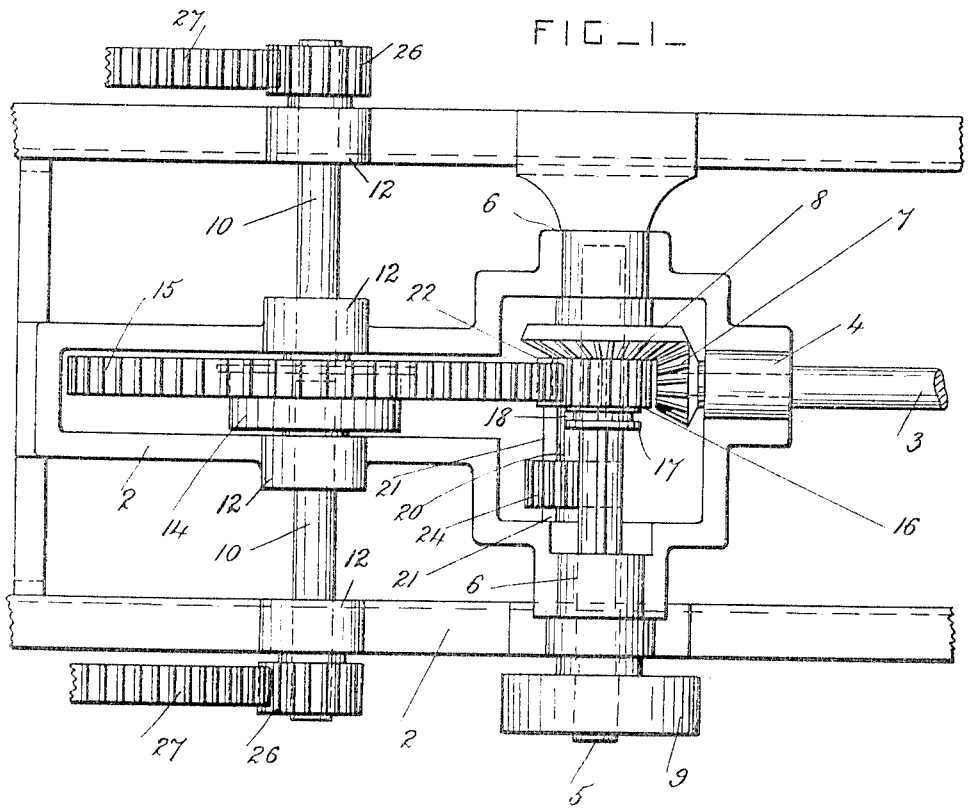
FIG_2_
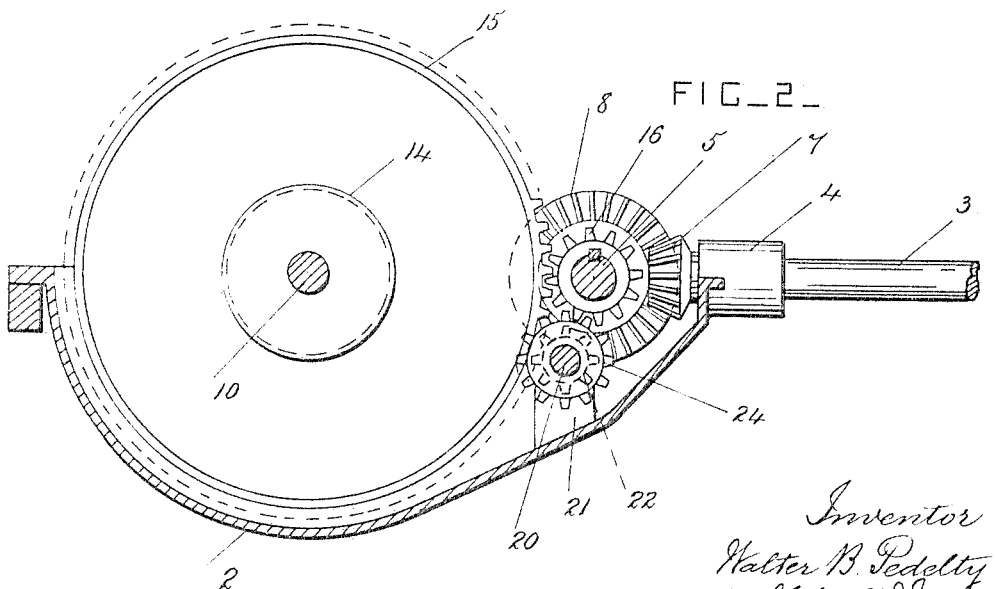
Inventor
Walter B. Pedelty
by Herbert W. Jenner
Attorney.

UNITED STATES PATENT OFFICE.

WALTER B. PEDELTY, OF MASON CITY, IOWA, ASSIGNOR TO THE AULTMAN AND TAYLOR MACHINERY COMPANY, OF MANSFIELD, OHIO.

DRIVING MECHANISM.

1,258,446.  Specification of Letters Patent.  Patented Mar. 5, 1918.

Application filed July 11, 1917. Serial No. 179,885.

*To all whom it may concern:*

Be it known that I, WALTER B. PEDELTY, a citizen of the United States, residing at Mason City, in the county of Cerro Gordo and State of Iowa, have invented certain new and useful Improvements in Driving Mechanism; and I do hereby declare the following to be a full, clear, and exact description of the invention, such as will enable others skilled in the art to which it appertains to make and use the same.

This invention relates to a driving mechanism or transmission gearing for tractors and motor cars; and it consists of a train of toothed wheels and other co-acting parts specially adapted to afford a straight line drive, and to enable the tractor to be propelled forwardly and rearwardly, as hereinafter fully described and claimed.

In the drawings, Figure 1 is a plan view of a transmission gear constructed according to this invention. Fig. 2 is an end view of the transmission gear, partially in section.

A suitable supporting frame or casing 2 is provided, and 3 is the main driving shaft or motor shaft which is journaled in a bearing 4 on the main frame. The shaft 3 is preferably arranged longitudinally of the frame 2, and the motor, which is of any approved construction, is preferably arranged at the front end portion of the frame.

A cross-shaft 5 is journaled in bearings 6 on the frame to the rear of the main driving shaft 2, and a beveled toothed pinion 7 is secured on the shaft 2, and gears into a beveled toothed wheel 8 secured on the cross-shaft 5. A driving wheel or belt pulley 9 is also secured on one end portion of the shaft 5, so that the motor may be used as a stationary engine when desirable.

A countershaft 10 is journaled in bearings 12 on the frame, and is arranged parallel to and to the rear of the cross-shaft 5, and is formed of two sections arranged axially in line with each other. A differential gear of any approved construction is provided, and is connected to the middle part of the countershaft 10 in any approved way, and this differential gear is inclosed in a casing 14, and is not herein more fully described and illustrated as it is of any standard make. A toothed wheel 15 is secured on the casing 14 of the differential gear so as to revolve the sections of the countershaft 10.

A toothed pinion 16 is splined on the cross-shaft 5, and is arranged so that it can be slid longitudinally on it, into and out of gear with the toothed wheel 15. A collar 17 having a circumferential groove 18 is provided on one end of the pinion 16, and a reversing arm, rod or lever of any approved construction is provided for engaging with the groove 18 and sliding the pinion 16 and holding it in any desired location on its shaft.

A reversing shaft 20 is journaled in bearings 21 on the frame, and a toothed pinion 22 is secured on the shaft 20, and is arranged constantly in gear with the toothed wheel 15 on the casing of the differential gear.

A small toothed wheel 24 is also secured on the reversing shaft 20, and a space of greater width than the pinion 16 is left between the wheel 24 and the pinion 22. The reversing shaft 20 is arranged parallel to the cross shaft 5, and the parts are proportioned so that the pinion 16 can be slid on its shaft 5 out of gear with the wheel 15 and into gear with the small wheel 24.

When the pinion 16 is in gear with the wheel 15 the tractor is driven forwardly, and when in gear with the wheel 24 the tractor is driven rearwardly.

The pinion 22 is made smaller in diameter than the pinion 16, so that the tractor is driven more slowly in a rearward direction than in a forward direction, with the same speed of motor shaft.

The sections of the shaft 10 have similar toothed pinions 26, commonly called bull pinions, secured on their outer end portions. Each pinion 26 is arranged constantly in gear with a toothed master wheel 27 which drives one of the traction wheels of the tractor. The traction wheels of the tractor are of any approved make, and each is preferably arranged concentric with its master wheel 27 to which it is connected in any approved way, the traction wheels and their connections being alike on each side of the machine. The shaft bearings 6, 12 and 21 are all rigidly secured to the frame 2 so that the shafts which revolve in them are all held constantly at the same distances apart from each other. The driving shaft 3 and the toothed wheel 15 are arranged at the middle part of the frame and substantially midway between its two longitudinal side bars, so that the driving is effected upon the longitudinal center line of the tractor. The shaft 3 is arranged on the other side of the shaft 5 from the shaft 10, and these shafts are all arranged in the same horizontal plane.

What I claim is:

1. In a driving mechanism for a tractor, a supporting frame, the toothed main wheel of a differential gear journaled in the frame, a cross-shaft journaled in the frame, a reversing shaft also journaled in the frame, said shafts being constantly held parallel to the axis of the main wheel and at the same distance from it and from each other by the said frame, a toothed pinion secured on the reversing shaft and running constantly in gear with the said main wheel, a toothed reversing wheel secured on the reversing shaft, a toothed pinion revolving with and slidable on the cross-shaft and adapted to be slid into and out of gear with the said main wheel and with the said reversing wheel, a beveled toothed wheel secured on the cross-shaft and arranged on the other side of the slidable pinion from the reversing wheel, a main driving shaft journaled longitudinally in the frame and arranged in the plane of revolution of the said main wheel, and a beveled toothed pinion secured on the main driving shaft and gearing into the said beveled toothed wheel.

2. In a driving mechanism for a tractor, a supporting frame, the toothed main wheel of a differential gear journaled in the frame, a cross-shaft journaled in the frame, a beveled toothed wheel secured on the cross-shaft, a main driving shaft journaled longitudinally in the frame and arranged in the plane of revolution of the said main wheel, a beveled toothed pinion secured on the main driving shaft and gearing into the said beveled toothed wheel, and reversible driving wheels operatively connecting the said cross-shaft with the said main wheel, the axes of the said main wheel, reversing wheels, and cross-shaft being constantly held at the same distances apart by the said frame.

In testimony whereof I have affixed my signature.

WALTER B. PEDELTY.